United States Patent Office 3,250,772
Patented May 10, 1966

3,250,772
SULFUR-SUBSTITUTED 1,3,5-TRIAZINES
Martin Dexter, Briarcliff Manor, Martin Knell, Ossining, and Eric A. Roskin, Bronx, N.Y., assignors to Geigy Chemical Corporation, Greenburgh, N.Y., a corporation of Delaware
No Drawing. Filed July 20, 1965, Ser. No. 473,510
6 Claims. (Cl. 260—248)

This application is a continuation-in-part of copending application Serial No. 361,533, filed April 21, 1964, now allowed, which in turn is a continuation-in-part of copending application Serial No. 87,520, filed February 21, 1961, now abandoned, which in turn is a continuation-in-part of copending application Serial No. 47,159, filed August 3, 1960, now abandoned, which in turn is a continuation-in-part of copending application, Serial No. 21,-604, filed April 12, 1960, now abandoned.

The present invention pertains to novel 1,3,5-triazines substituted in the 2, 4 and 6 positions.

The compounds of this invention may be represented by the formula:

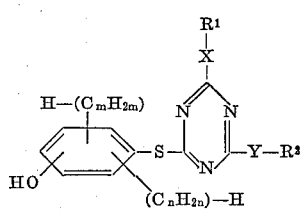

I wherein each of $R^1$ and $R^2$ is either the group $$-(C_qH_{2q}-S)_p-C_xH_{2x+1}$$

or the group

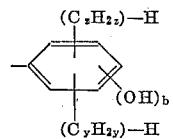

and each of X and Y is either

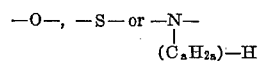

in which each of $n$, $m$, $z$ and $y$ has a value of from 0 to 6, each of $a$ and $x$ has value of from 0 to 30, $q$ has a value of from 2 to 6, $p$ has a value of from 0 to 3 and $b$ has a value of from 0 to 1.

$R^1$ and $R^2$ may be alike or different and may be hydrogen, alkyl, alkylthio(lower)alkyl, alkylthio(lower)alkylthio(lower)alkyl or alkylthio(lower)alkylthio(lower)alkylthio(lower)alkyl. $R^1$ and $R^2$ may also be phenyl, mono(lower)alkylphenyl, di(lower)alkylphenyl, hydroxyphenyl, mono(lower)alkylhydroxyphenyl or di(lower)alkylhydroxyphenyl.

It will also be observed that in each instance the triazine compounds of the present invention posses a hydroxyphenyl group or alternatively, in the more preferred species, a mono or di(lower)alkylhydroxyphenyl group. The hydroxy group may be in the ortho, meta or para positions (with respect to the group joining the phenyl group to the triazine ring) although the para position is preferred. While the (lower)alkyl groups on this hydroxyphenyl group may be any saturated hydrocarbon having from one to six carbon atoms, the t-butyl group is especially preferred. Furthermore while one or two alkyl groups may be in any of the remaining four positions in the hydroxyphenyl group, it is generally desirable, if possible, for at least one and preferably both to be on the carbon atoms of the phenyl ring which are adjacent to the hydroxy group.

X and Y may be alike or different and may be a divalent oxygen atom, a divalent sulfur atom, an imino group or an alkylimino group.

By the term "alkyl" is meant a branched or straight chained saturated hydrocarbon group of from one to about thirty carbon atoms. Representative of such groups are thus methyl, ethyl, propyl, isopropyl, butyl, s-butyl, t-butyl, pentyl, hexyl, octyl, decyl, dodecyl, tetradecyl, hexadecyl, octadecyl, eicosyl, docosyl, tetracosyl, hexacosyl, octacosyl, triacontyl and the like. When the term alkyl is qualified by the designation "(lower)," there is included branched or straight chained hydrocarbon groups of from one to about six carbon atoms; e.g., methyl, ethyl, propyl, isopropyl, butyl, s-butyl, t-butyl, pentyl, hexyl and the like.

Compounds falling within the above formula are surprisingly effective stabilizers of organic material normally subject to deterioration, presumably oxidative deterioration. Such material includes for example, synthetic organic polymeric substances such as vinyl resins formed by the polymerization of vinyl halides or from the copolymerization of vinyl halides with unsaturated polymerizable compounds, e.g., vinyl esters, $\alpha,\beta$-unsaturated esters, $\alpha,\beta$-unsaturated acids, $\alpha,\beta$-unsaturated ketones or aldehydes and unsaturated hydrocarbons such as butadiene and styrene; poly-$\alpha$-olefins such as polypropylene, polyethylene, polybutylene, polyisoprene and the like, including copolymers of poly-$\alpha$-olefins; polyurethanes such as are prepared from polyols and organic polyisocyanates; polyamides such as poly(hexamethylene adipamide); polyesters such as poly(methylene terephthalates); polycarbonates; polyacetals; polystyrene; poly(ethylene oxide); copolymers such as those formed by the copolymerization of acrylonitrile, butadiene and/or styrene; as well as physical mixtures of the above such as high impact polystyrene containing copolymers of butadiene and styrene; and the like.

Other materials stabilized by the present invention include lubricating oils such as those of the aliphatic ester type, e.g., dihexyl azelate, di-(2-ethylhexyl)azelate, di-(3,5,5-trimethylhexyl)glutarate, di-(3,5,5-trimethylpentyl) glutarate, di-(2-ethylhexyl)pimelate, di-(2-ethylhexyl) adipate, diisoamyl adipate, triamyl tricarballate, pentaerythritol tetracaproate, dipropylene glycol dipelargonate, 1,5-pentanediol di-(2-ethylhexanoate), and the like; fats and oils of animal and vegetable origin, e.g., linseed oil, menhaden oil, cod liver oil, castor oil, olive oil, rapeseed oil, coconut oil, palm oil, corn oil, sesame oil, peanut oil, cotton seed oil, butter, fat, lard, beef tallow and the like; saturated and unsaturated hydrocarbons such as for example, both natural and synthetic gasolines, jet fuels, diesel oils, mineral oils, fuel oils, drying oils, waxes and resins.

A particularly valuable class of organic materials stabilized by the compounds of the present invention are those of the group consisting of polypropylene, polyethylene, polystyrene, aliphatic aldehydes, aliphatic ester lubricants, fats, oils of animal origin, oils of vegetable origin, hydrocarbons boiling in the gasoline range, mineral oil and hydrocarbon wax.

By utilizing from about 0.001% to about 10% by weight, preferably from about 0.001% to about 5% by weight, of the compounds of this invention, such organic materials are stabilized during processing, e.g., milling of polypropylene, blow molding of polyethylene and during use. Such signs of oxidative deterioration as discoloration and embrittlement of polymers, gumming of hydrocarbons, spoilage of oils and fats and the like are thus substantially eliminated, reduced and/or retarded by the presence of a stabilizing amount of these compounds.

These compounds may be used singly, in combination with one another, or in conjunction with other additives such as antioxidants, pourpoint depressants, corrosion and rust inhibitors, dispersing agents, demulsifiers, antifoam agents, carbon black, accelerators, plasticizers, color stabilizers, heat stabilizers, ultraviolet absorbers, dyes, pigments and the like. Not only are the functions of such additives unimpaired, they are often improved. Furthermore in certain instances, the addition of a so-called "synergist" such as dilaurylthiodipropionate, or similar sulfur-containing esters, greatly increases the stabilizing properties of these compounds. This is particularly evident with symmetrical compounds of the present invention such as 2,4,6-tris-(4-hydroxy-3,5 - di-t-butylphenylthio)-1,3,5-triazine which falls within Formula IV, infra.

Particularly valuable subclasses of compounds are those of Formula II–VI below in which $n$, $m$, $p$, $q$ and $x$ are as defined for Formula I:

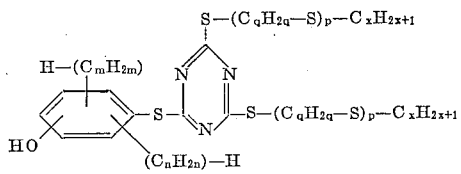

II

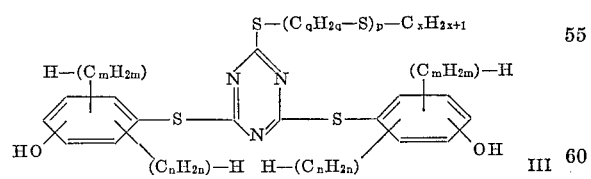

III

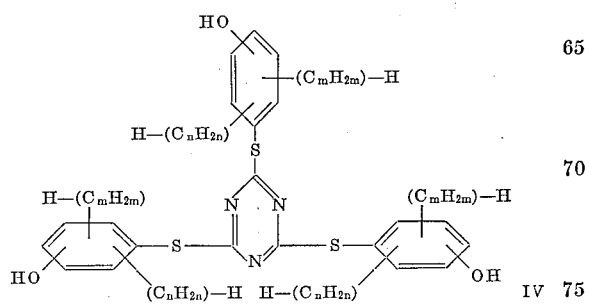

IV

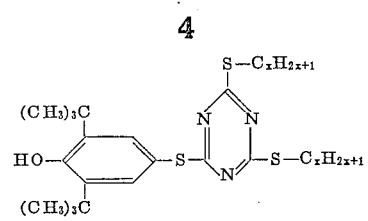

V

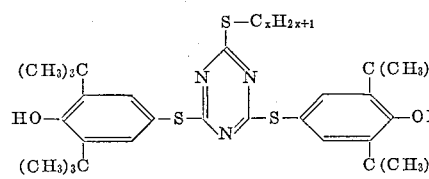

VI

Preferably in Formula I–IV when $x$ is zero, $p$ is zero.

The compounds of the present invention are preferably prepared from cyanuric chloride although triazine compounds having other reactive groups may alternatively be used. Depending upon the nature of the final compound, the preparation may entail only one step (as in the case of symmetrically substituted triazines) or two or three steps (as in the case of unsymmetrically substituted triazines). The number of different groups generally dictates the number of steps, each step involving the introduction of one or more like groups. When one or more of the substituents attached to the triazine carbons is sulfur, a mercaptan may be employed to react with one or more chlorine atoms on the triazine ring. Other variations are of course possible, such as reacting a halide with a mono, di or trimercaptotriazine. The number of groups introduced on any triazine intermediate having more than one chlorine atom present may be controlled as for example by limiting the quantities of reactants.

The following chart demonstrates some of the various alternative synthetic routes available, starting with cyanuric chloride (VII) to various final compounds (VIII–XIII). In those instances in two or more like groups are introduced all may of course be introduced in one step. In this schematic representation, R is a nonspecific designation embracing $R^1$, $R^2$ (including hydrogen) and the hydroxyphenyl group of Formula I. It is also to be understood that the "H" of ROH and RSH may be replaced by sodium, potassium or another suitable halogen reactive group.

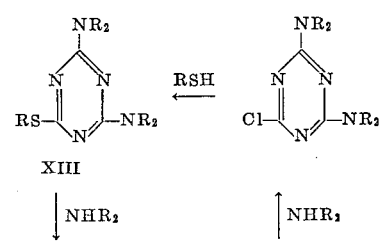

XIII

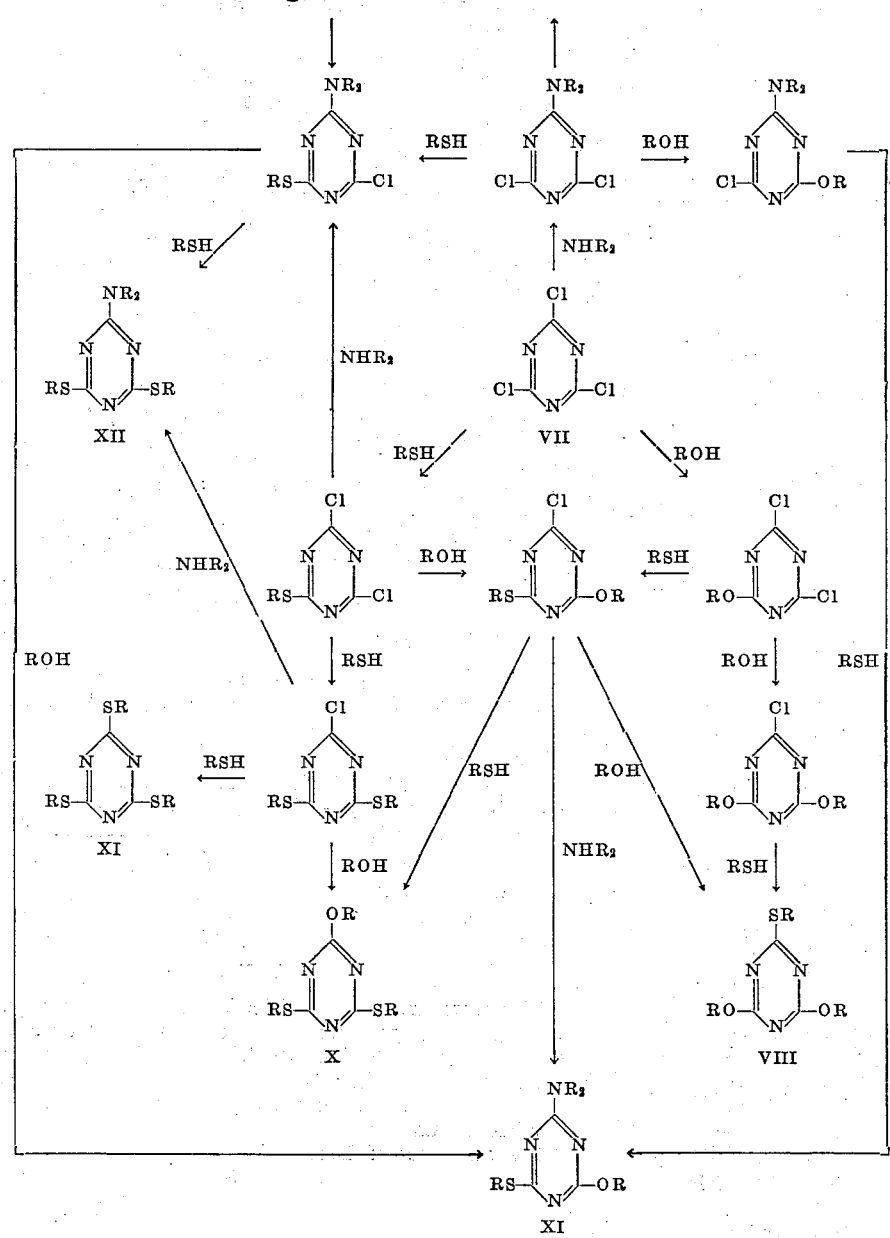

Although the preparation of the starting materials for the present compounds is readily within the capabilities of those skilled in the art, specific exemplification for the starting materials is provided in copending application Serial No. 361,533, the disclosure of which is incorporated herein by reference.

The following examples will further serve to typify and illustrate the nature of this invention but are not intended in any way as a limitation of the scope thereof. In these examples, parts are by weight unless otherwise noted and the relationship of parts by weight to parts by volume is as that of grams to cubic centimeters. Temperature is expressed in degrees centigrade.

EXAMPLE 1

*6-(4-hydroxy-3,5-di-t-butylphenylthio)-2,4-bis-(n-octylthio)-1,3,5-triazine*

An alcoholic solution of sodium 4-hydroxy-3,5-di-t-butylphenylmercaptide (prepared by dissolving 23 parts of sodium in 2000 parts by volume of ethanol and adding 238 parts of 4-mercapto-2,6-di-t-butylphenol [Hotelling et al. J. Org. Chem. 24, 1958 (1959)] is added with stirring to a solution of 404 parts of 2,4-bis-(n-octylthio)-6-chloro-1,3,5-triazine in 2000 parts by volume of ethanol. After the exothermic reaction has subsided, the reaction is allowed to stand at normal room temperature for several hours. The solid is removed by filtration and the ethanol removed from the filtrate by evaporation. The oily residue is then dissolved in hexane and adsorbed on a silica gel column. After removing impurities by elution with hexane, the product, 6-(4-hydroxy-3,5-di-t-butylphenylthio)-2,4-bis-(n-octylthio)-1,3,5-triazine is eluted with 50% by volume of benzene-hexane and isolated by evaporation of the solvent.

Calc. for $C_{33}H_{55}ON_3S_3$: C, 65.4; H, 9.15; N, 6.93; S, 15.88. Found: C, 65.29; H, 9.15; N, 6.73; S, 16.16.

By replacing 4-mercapto-2,6-di-t-butylphenol with 4-mercapto-2,6-dimethylphenol [Hotelling et al. J. Orig. Chem. 24, 1598 (1959)], 6-(4-hydroxy-3,5-dimethylphenylthio-2,4-bis-(n-octylthio)-1,3,5-triazine is obtained (isolated by elution chromatography using a silica gel column and eluting with 75% by volume benzene-hexane).

Calc. for $C_{27}H_{43}ON_3S_3$: C, 62.15; H, 8.31; N, 8.05; S, 18.44. Found: C, 62.13; H, 7.93; N, 7.63; S, 18.37.

In an analogous fashion, 6-(4-hydroxy-3,5-di-t-butylphenylthio) - 2,4 - bis - (2,3 - dimethylphenylthio) - 1,3,5- triazine is obtained when 7.4 parts of 6-(4-hydroxy-3,5-di-t-butylphenylthio)-2,4-dichloro-1,3,5-triazine in 100 parts by volume of ethanol are mixed with 8.4 parts of 2,3-dimethylbenzenethiol (66% pure oil) and 0.92 part of sodium dissolved in 50 parts by volume of ethanol. The resultant mixture is allowed to stand for 2 hours, after which the salt which forms is removed by filtration and the filtrate treated with steam to remove volatiles, including ethanol. The residual oil solidifies and the aqueous layer is decanted. This solid is dissolved in petroleum ether and the resultant mixture dried over magnesium sulfate. Upon evaporation of the petroleum ether, 6 - (4 - hydroxy - 3,5 - di - t - butylphenylthio) - 2,4 - bis-(2,3-dimethylphenylthio)-1,3,5-triazine) is obtained, and further purified by dissolution in hexane and chromatography on a silica gel column using 50% benzene-hexane as the eluant.

EXAMPLE 2

The following novel sulfur-substituted 1,3,5-triazines are prepared by treating the appropriately-substituted triazine starting materials with appropriate thiols. The procedure used is the same as in Example 1 herein, except where indication is made to the procedures of the examples of copending application Serial No. 361,533, filed April 21, 1964:

6-(4-hydroxy-3,5-di-t-butylphenylthio)-2,4-bis-ethylthio)1,3,5-triazine
6-(4-hydroxy-3,5-di-t-butylphenylthio)-2,4-bis-(n-octadecylthio)-1,3,5-triazine
6-(4-hydroxy-3,5-di-t-butylphenylthio)-2,4-bis-(t-butylthio)-1,3,5-triazine
6-(4-hydroxy-3,5-di-t-butylphenylthio)-2,4-bis-(p-t-butylphenylthio)-1,3,5-triazine
4,6-bis-(4-hydroxy-3,5-di-t-butylphenylthio)-2-n-octylthio-1,3,5-triazine (S.N. 361,533, Ex. 2)
6-(4-hydroxy-3,5-di-t-butylphenylthio)-2,4-bis-(phenylthio)-1,3,5-triazine (S.N. 361,533, Ex. 3)
6-(4-hydroxy-3,5-di-t-butylphenylthio)-2,4-bis-(anilino)-1,3,5-triazine (S.N. 361,533, Ex. 4)
6-(4-hydroxy-3,5-di-t-butylphenylthio)-2,4-bis-n-octylamino)-1,3,5-triazine (S.N. 361,533, Ex. 5)
6-(4-hydroxy-3,5-di-t-butylphenylthio)-2,4-bis-(ethoxy)-1,3,5-triazine (S.N. 361,533, Ex. 7)
6-(4-hydroxy-3,5-di-t-butylphenylthio)-2,4-bis-n-octyloxy)-1,3,5-triazine (S.N. 361,533, Ex. 8)
6-(2-hydroxy-3-t-butyl-5-methylphenylthio)-2,4-bis-(n-octylthio)-1,3,5-triazine (S.N. 361,533 Ex. 9)
6-(4-hydroxy-3,5-di-t-butylphenylthio)-2-mercapto-4-n-octadecylthio-1,3,5-triazine
6-(4-hydroxyphenylthio)-2,4-bis-(n-octylthio)-1,3,5-triazine (S.N. 361,533, Ex. 9)
6-(4-hydroxy-3,5-di-t-butylphenylthio)-2,4-bis-(n-octylthioethylthio)-1,3,5-triazine (S.N. 361,533, Ex. 10)
6-(4-hydroxy-3,5-di-t-butylphenylthio)-2,4-bis-(4-t-butylphenoxy)-1,3,5-triazine (S.N. 361,533, Ex. 11)
6-(4-hydroxy-3,5-di-t-butylphenylthio)-2,4-bis-(p-octadecylphenoxy)-1,3,5-triazine (S.N. 361,533, Ex. 11)
6-(4-hydroxy-3,5-di-t-butylphenylthio)-2,4-bis-(menthylthio)-1,3,5-triazine (S.N. 361,533, Ex. 11)
6-(4-hydroxy-5-methylphenylthio)-2,4-bis-(n-octylthio)-1,3,5-triazine (S.N. 361,533, Ex. 12)
6-(4-hydroxy-2,6-dimethylphenylthio)-2,4-bis-(n-octylthio)-1,3,5-triazine (S.N. 361,533, Ex. 12)
2,4-bis-(4-hydroxy-3,5-di-t-butylphenylthio)-6-n-octylthio-1,3,5-triazine (S.N. 361,533, Ex. 15)
2,4-bis-(4-hydroxy-3-methyl-5-t-butylphenylthio)-6-n-dodecylthio-1,3,5-triazine (S.N. 361,533 Ex. 15)
6-(4-hydroxy-3,5-di-t-butylphenylthio)-2-(n-octylthio)-4-phenylthio-1,3,5-triazine (S.N. 361,533, Ex. 16)
6-(4-hydroxy-3,5-di-t-butylphenylthio)-2,4-bis-(mercapto)-1,3,5-triazine
2,4,6-bis-(4-hydroxy-3,5-di-t-butyphenylthio)1,3,5-triazine (S.N. 361,533, Ex. 18)
6-(4-hydroxy-3,5-di-t-butylphenylthio)-2,4-bis-(n-dodecylthioethylthio)-1,3,5-triazine (S.N. 361,533, Ex. 20)
2,4-bis-(4-hydroxy-3,5-di-t-butylphenylanilino)-6-(n-octylthiopropylthio)-1,3,5-triazine S.N. 361,533, Ex. 21)
2,4-bis-(4-hydroxy-3,5-di-t-butylthiophenyl)-6-(n-dodecylamino)-1,3,5-triazine (S.N. 361,533 Ex. 22)
2,4-bis-(4-hydroxy-3,5-di-t-butylphenylthio)-6-amino-1,3,5-triazine (S.N. 361,533, Ex. 22)

EXAMPLE 3

Unstabilized polypropylene powder (Hercules Profax 6501) is thoroughly blended with 0.05% by weight of the following compounds of this invention and milled on a two-roller mill at 182° for 10 minutes, after which time the stabilized polypropylene is sheeted from the mill and allowed to cool.

The milled polypropylene sheet is cut into small pieces and pressed for from 5–10 minutes on a hydraulic press at 218° and 175 pounds per square inch pressure. The resultant sheet of 25 mil thickness is then tested for resistance to accelerated aging in a forced draft oven at 149°. The unstabilized polypropylene deteriorates after 3 hours. The following table presents representative oven lives for polypropylene stabilized by various compounds of the present invention:

6 - (4 - hydroxy - 3,5 - di - t - butylphenylthio) - 2,4-bis-(n-octylthio)-1,3,5-triazine _____ 285
6 - (4 - hydroxy - 3,5 - dimethylphenylthio) - 2,4-bis-(n-octylthio)-1,3,5-triazine _____ 310

Similarly compositions of polyethylene, polystyrene elevated temperatures for prolonged periods of time. and the like are highly stabilized by the compounds of this invention.

EXAMPLE 4

The procedure of Example 3 is employed to prepare compositions of polypropylene and the novel sulfur-substituted triazines of Example 2. The polypropylene is found to be stabilized efficiently against deterioration at elevated temperatures for prolonged periods of time.

What is claimed is:
1. A compound of the formula:

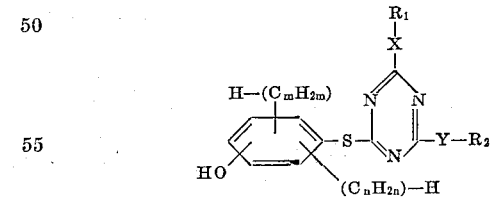

wherein each of $R^1$ and $R^2$ is selected from the group consisting of $-(C_qH_{2q}-S)_p-C_xH_{2x+1}$ and

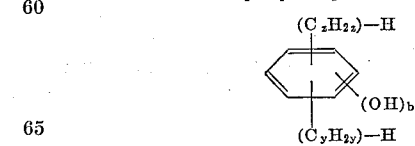

and each of X and Y is selected from the group consisting of $-O-$, $-S-$ and

in which each of $n$, $m$, $z$ and $y$ has a value of from 0 to 6 each of $a$ and $x$ has a value of from 0 to 30, $q$ has a value of from 2 to 6, $p$ has a value of from 0 to 3 and $b$ has a value of from 0 to 1.

2. A compound of the formula:

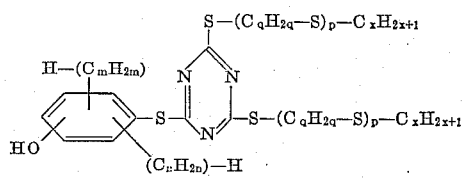

wherein each of $n$ and $m$ has a value of from 0 to 6, $q$ has a value of from 2 to 6, $p$ has a value of from 0 to 3 and $x$ has a value of from 0 to 30.

3. A compound of the formula:

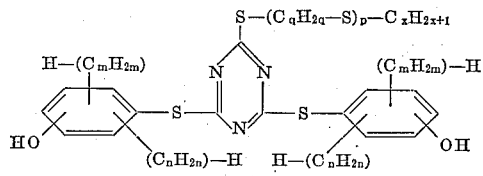

wherein each of $n$ and $m$ has a value of from 0 to 6, $q$ has a value of from 2 to 6, $p$ has a value of from 0 to 3 and $x$ has a value of from 0 to 30.

4. A compound of the formula:

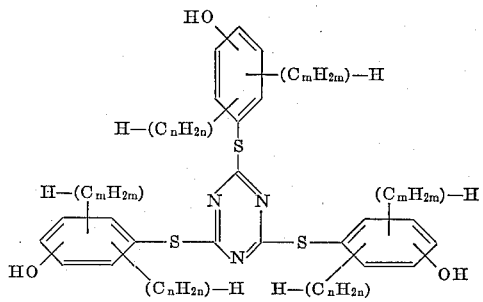

wherein each of $n$ and $m$ has a value of from 0 to 6.

5. A compound of the formula:

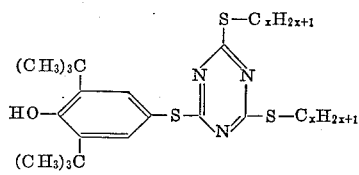

wherein $x$ has a value of from 0 to 30.

6. A compound of the formula:

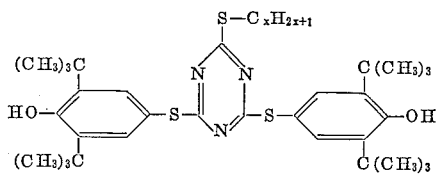

wherein $x$ has a value of from 0 to 30.

References Cited by the Examiner
UNITED STATES PATENTS
2,676,151  4/1954  Loughran _____ 260—248 X WALTER A. MODANCE, *Primary Examiner.*
J. M. FORD, *Assistant Examiner.*